United States Patent
Leinfelder (10) Patent No.: US 9,983,226 B2
(45) Date of Patent: May 29, 2018

(54) ACCELERATION SENSOR HAVING A REDUCED BIAS AND MANUFACTURING METHOD FOR AN ACCELERATION SENSOR

(71) Applicant: NORTHROP GRUMMAN LITEF GMBH, Freiburg (DE)

(72) Inventor: Peter Leinfelder, Ehrenkirchen (DE)

(73) Assignee: Northrop Grumman Litef GmbH (DE)

(*) Notice: Subject to any disclaimer, the term of this patent is extended or adjusted under 35 U.S.C. 154(b) by 0 days. days.

(21) Appl. No.: 15/541,389

(22) PCT Filed: Jan. 4, 2016

(86) PCT No.: PCT/EP2016/050014
§ 371 (c)(1),
(2) Date: Jul. 3, 2017

(87) PCT Pub. No.: WO2016/110460
PCT Pub. Date: Jul. 14, 2016

(65) Prior Publication Data
US 2017/0343579 A1 Nov. 30, 2017

(30) Foreign Application Priority Data
Jan. 5, 2015 (DE) .................. 10 2015 000 158

(51) Int. Cl.
*G01P 15/125* (2006.01)
*G01P 15/08* (2006.01)

(52) U.S. Cl.
CPC ........ *G01P 15/125* (2013.01); *G01P 15/0802* (2013.01)

(58) Field of Classification Search
CPC .................................................. G01P 15/125
(Continued)

(56) References Cited

U.S. PATENT DOCUMENTS 5,618,989 A * 4/1997 Marek .................. G01P 15/125
   73/1.38
5,817,942 A 10/1998 Greiff
(Continued)

FOREIGN PATENT DOCUMENTS

DE        101 48 858 A1      4/2003
DE    10 2013 007 593 A1    11/2014
(Continued)

OTHER PUBLICATIONS

International Search Report for Application No. PCT/EP2016/050014 dated Apr. 4, 2016.
(Continued)

*Primary Examiner* — Paul West
*Assistant Examiner* — Mark A Shabman
(74) *Attorney, Agent, or Firm* — Tarolli, Sundheim, Covell & Tummino LLP (57) ABSTRACT

The invention relates to an acceleration sensor (400) comprising an excitation mass (420) having excitation electrodes (430), which excitation mass is movably mounted over a substrate (410) along a movement axis (x) and comprising detection electrodes (440) which are permanently connected to the substrate (410) and allocated to the excitation electrodes (430). A first group of pairings (450) of excitation electrode (430) and allocated detection electrodes (440) is suitable for deflecting the excitation mass (420) along the movement axis (x) in a first direction (460). A second group of pairings (450) of excitation electrodes (430) and allocated detection electrodes (440) is suitable for deflecting the excitation mass (420) along the movement axis (x) in a second direction (465), which is opposite the first direction (460). The number of pairings (450) in the first group is equal to the number of pairings (450) in the second group. The averaged distance between excitation electrodes (430)
(Continued)

and detection electrodes (440) of the pairings (450) of the first group corresponds to the averaged distance between excitation electrodes (430) and detection electrodes (440) of the pairings (450) of the second group.

6 Claims, 5 Drawing Sheets

(58) Field of Classification Search
USPC .................................................. 73/514.32
See application file for complete search history.

(56) References Cited

U.S. PATENT DOCUMENTS

| | | | | |
|---|---|---|---|---|
| 7,013,730 | B2 * | 3/2006 | Malametz | G01P 15/08 |
| | | | | 248/628 |
| 7,337,671 | B2 * | 3/2008 | Ayazi | B81C 1/00182 |
| | | | | 73/514.32 |
| 8,381,570 | B2 * | 2/2013 | Ohms | G01P 15/125 |
| | | | | 73/1.37 |
| 2002/0011107 | A1 * | 1/2002 | Sakai | G01P 15/0802 |
| | | | | 73/514.32 |
| 2005/0132805 | A1 * | 6/2005 | Park | G01P 15/125 |
| | | | | 73/514.32 |
| 2011/0113880 | A1 * | 5/2011 | Schmid | G01P 15/125 |
| | | | | 73/514.01 |
| 2016/0069928 | A1 * | 3/2016 | Geiger | G01P 15/0802 |
| | | | | 73/514.32 |

FOREIGN PATENT DOCUMENTS

| | | |
|---|---|---|
| DE | 10 2013 208688 A1 | 11/2014 |
| WO | 2004/076340 A1 | 9/2004 |
| WO | 2005/083451 A1 | 9/2005 |

OTHER PUBLICATIONS

Jiang T et al: "Paticulate Failures for Surface-Micromachined Mems", Proceedings International Test Conference 1999. ITC'99. Atlantic city, NJ, Sep. 28-30, 1999, vol. CONF. 30, Sep. 1, 1999, pp. 329-337.

* cited by examiner

ACCELERATION SENSOR HAVING A REDUCED BIAS AND MANUFACTURING METHOD FOR AN ACCELERATION SENSOR

RELATED APPLICATIONS

The present invention is a U.S. National Stage under 35 USC 371 patent application, claiming priority to Serial No. PCT/EP2016/050014, filed on 4 Jan. 2016; which claims priority from DE 10 2015 000 158.2, filed 5 Jan. 2015, the entirety of both of which are incorporated herein by reference.

The invention is concerned with an acceleration sensor having a reduced bias and a manufacturing method for an acceleration sensor having a reduced bias.

In various applications within the prior art acceleration sensors are used for measuring acceleration. Here, it is often of importance that the acceleration sensors are only of small size. Therefore, miniaturized acceleration sensors are used. These may for example be micro-electro-mechanical systems (MEMS).

The acceleration sensors operate according to the principle that the deviation of a mass that is movable along an axis is captured via electrode pairs, whose one electrode is connected firmly to the mass, whereas the other electrode is fixed. Due to the change of the electric field between the electrodes the temporal evolution of the movement of the mass can be captured. This allows calculating the accelerations acting on the mass, and due to this to determine the acceleration acting on the entire system.

Typically an acceleration sensor comprises a plurality of electrode pairings, one electrode of which can be arranged at different positions of the mass. In order to ensure a reliable and precise acceleration measurement it is necessary to be able to control the electromagnetic forces generated by the electrodes precisely. To this end it is necessary to know the gap distances between the electrode pairs. However, these may be subject to variations caused in the manufacturing process.

If the acceleration sensors are generated by etching a substrate by means of an etch mask, there is the problem that the etch fluid may be distributed unevenly on the substrate, e.g. by spreading of the etch fluid. For example, during etching a slight inclination of the substrate to be etched, e.g. a Si wafer, may occur, which leads to an uneven spread of the etch fluid across the substrate. In regions of the substrate that lie due to the inclination at a lower level more etch fluid will accumulate than in regions lying at a higher level. Because of this, more material will be removed at the lower level regions than in the higher level regions. This may lead to different gap widths or gap depths of the single electrode pairs that are etched into the substrate. This effect of varying gap distances caused by spreading etch fluid is called "trending".

Due to this effect deviations of etch depths and etch widths within an acceleration sensor occur that are difficult to control during manufacturing. Because of these different etch depths and etch widths the gap distance of single electrode pairs of an acceleration sensor may vary across the surface of the acceleration sensor. Then, the electrode pairs lead to different forces onto the mass for the same voltage between the single electrode pairs, which may lead to biasing of the measurement results.

DE 10 2013 208 688 A1 discloses sensing means for a micro-mechanical sensing device that comprises: a seismic mass that is moveable along a sensing direction; and at least one sensing element arranged orthogonally to the sensing direction at a side of the seismic mass; characterized by comb electrode being at least respectively arranged orthogonal to the sensing element at opposite sides of the seismic mass; wherein a constant electric compensation voltage can be applied to the at least two comb electrodes in order to compensate a mechanical offset of the sensing element.

DE 101 48 858 A1 discloses a micro-mechanical sensor comprising a substrate that has a structure layer thereon; a seismic mass being moveable relative to the structure layer, if a spring force is applied thereto; at least one measurement capacitor electrode arrangement for capturing a shift of the seismic mass along a measurement direction and at least one drive capacitor electrode arrangement for deflecting the seismic mass along a self-test direction; wherein the measurement direction is arranged perpendicular to the self-test direction, as well as a corresponding optimization method.

U.S. Pat. No. 5,817,942 A discloses an acceleration sensor having sensor electrodes on a sensor mass, which sensor electrodes are interleaved with excitation electrodes. The pairings of sensor electrodes and excitation electrodes are suitable for detecting and exciting a movement of the sensor mass along an excitation direction.

The present invention is concerned with the problem of providing an acceleration sensor and a method for manufacturing an acceleration sensor having a reduced bias.

This problem is solved by the subject-matter of the independent claims. Further embodiments are defined by the dependent claims.

An acceleration sensor comprises: an excitation mass having excitation electrodes, which excitation mass is mounted moveably along a movement axis above a substrate; detection electrodes that are fixedly connected to the substrate and that correspond to the excitation electrodes. Here, a first group of pairings of excitation electrodes and corresponding detection electrodes is configured to deflect the excitation mass along the movement axis in a first direction, and a second group of pairings of excitation electrodes and corresponding detection electrodes is configured to deflect the excitation mass along the movement axis in a second direction that is opposite to the first direction. The number of pairings of the first group is equal to the number of pairings in the second group. The averaged distance between excitation electrodes and detection electrodes of pairings of the first group corresponds to the averaged distance between excitation electrodes and detection electrodes of pairings of the second group.

A method for manufacturing an acceleration sensor comprises the steps: forming of an excitation mass having excitation electrodes, which excitation mass is mounted moveably along a movement axis above a substrate; forming of detection electrodes that are fixedly connected with the substrate and corresponding to the excitation electrodes. Here, these steps comprise: forming of a first group of pairings of excitation electrodes and corresponding detection electrode that are configured to deflect the excitation mass along the movement axis in a first direction, and forming a second group of pairings of excitation electrodes and corresponding detection electrodes that are configured to deflect the excitation mass along the movement axis in a second direction that is opposite to the first direction, wherein the number of pairings in the first group is equal to the number of parings in the second group; adjusting the averaged distance between excitation electrodes and detection electrodes of the pairings of the first group such that it corresponds to the averaged distance between excitation electrodes and detection electrodes of pairings of the second group.

The first group of pairings of excitation electrodes and detection electrodes deflects the excitation mass along the movement direction in a first direction, whereas the second group of pairings of excitation electrodes and detection electrodes deflects the excitation mass into the opposite direction. In order to prevent a bias, the force executed by the pairings of the first group must be equal to the force that is executed by the electrode pairings of the second group. This is achieved by adjusting the distances between the excitation electrodes and detection electrodes of the pairings in the first group and of the pairings in the second group, which distances determine the strength of the force, such that the averaged distance obtained from the single distances of the first group corresponds to the averaged distance of the second group.

The space between the excitation electrodes and the detection electrodes may have the form of a thin gap or slit that has an approximately rectangular area. In first approximation the distance between an excitation electrode and the corresponding detection electrode is obtained from the integral over the area between the two electrodes that is divided by the length of overlap of the electrodes. For exactly rectangular intermediate spaces between the electrodes this is precisely the distance between the electrodes. The averaged distance is then determined by integrating over the areas between single electrode pairs, summing the single distances obtained in that way, and dividing the sum by the number of pairings.

The averaged distance of the pairings of the first group may for example be equal to the averaged distance of pairings of the second group. Due to this, also the force that is executed by the pairings of the first group onto the excitation mass is equal to the force that is executed by the pairings of the second group. Biasing of the measurement results and hence occurrence of a bias can therefore be reduced or entirely avoided. The averaged distances of pairings of the first group and the averaged distance of pairings of the second group may, however, also be approximately the same, i.e. they differ only by a specific fractional amount. Also by such an arrangement the bias may be reduced substantially.

The first group may comprise at least two subgroups of pairings and the second group may comprise at least two subgroups of parings, wherein in the subgroups excitation electrodes and detection electrodes are arranged alternatingly. This simplifies manufacturing of the acceleration sensor, since within the subgroups the first and the second group of pairings of excitation electrodes and detection electrodes are arranged next to each other and since electrode pairings of the first group and the second group do not alternate. Stated differently, within one subgroup pairings of excitation electrodes and detection electrodes of one group are arranged next to each other. Hence, during manufacturing of the acceleration sensor one subgroup of parings can be manufactured that deflect the excitation mass in the same direction.

A virtual first connection line between centers of the at least two subgroups of the first group may cross a virtual second connection line between centers of the at least two subgroups of the second group. The centers of the subgroups are here defined as the centers of the smallest rectangles that include all electrodes of the respective subgroup.

This guarantees that the electrodes that generate a movement of the excitation mass in the first direction are arranged cross-over to the electrodes that generate a movement of the excitation mass in the second direction. This ensures that during a manufacturing process in which differing gap distances between the electrodes are caused by drifting etch fluid, i.e. by trending, the averaged distance of pairings of the first group is equal to the averaged distance of pairings of the second group.

Drifting of the etch fluid is caused by an inclination of the substrate to be etched, e.g. a Si wafer, wherein the inclination of the substrate causes accumulation of etch fluid with unequal heights on the substrate. The height of the etch fluid does however not change discontinuous, but follows a linear gradient. Hence, in an acceleration sensor that has electrode pairings of the first group arranged cross-over to electrode pairings of the second group it is automatically guaranteed that the differences in the gap width caused by different heights of etch fluid are averaged out. Manufacturing of acceleration sensors having a reduced bias is considerably simplified due to this, which leads also to a cost reduction.

On a first side of the excitation mass being parallel to the movement axis there may be arranged along the first axis and consecutive to each other at least two excitation electrodes of the first group and at least two excitation electrodes of the second group. Along a second side of the excitation mass being parallel to the movement axis there may be arranged along the first direction and consecutive to each other at least two excitation electrodes of the second group and at least two excitation electrodes of the first group. Here, the two excitation electrodes of the first group arranged on the first side of the excitation mass may be arranged opposite to the two excitation electrodes of the second group being arranged on the second side of the excitation mass. This defines a specific form of the acceleration sensor in which the excitation electrodes of the first group are arranged cross-over to the excitation electrodes of the second group. This leads to a simplification of manufacturing of acceleration sensors having reduced bias because of the aforementioned reasons.

The excitation electrodes and the detection electrodes may comprise comb electrodes having electrode fingers extending along the movement axis, wherein the electrode fingers of the excitation electrodes of the first group extend along the first direction, the electrode fingers of detection electrodes of the first group extend along the second direction, the electrode fingers of excitation electrodes of the second group extend along the second direction, and the electrode fingers of detection electrodes of the second group extend along the first direction. Here, the distance between excitation electrodes and detection electrodes is determined by the distance between the electrode fingers of the respective excitation electrodes and detection electrodes.

This guarantees that pairings of excitation electrodes and detection electrodes of the first group deflect the excitation mass in the first direction and pairings of excitation electrodes and detection electrodes of the second group deflect the excitation mass in the second direction. Due to the interleaving of electrode fingers of the excitation electrodes and the detection electrodes, the deflection is independent from the amount of deflection for deflections that are small compared to the length of electrode fingers, like they appear typically during operation of acceleration sensors. This allows simplified and more reliable measurements of accelerations. In addition, forming the electrodes as comb electrodes having electrode fingers along the movement axis allows deflecting the excitation mass without undesired effects on the oscillation system of the excitation mass, such as for example a modification of the spring stiffness of the oscillation system due to electromagnetic interactions.

Alternatively, the pairings of excitation electrodes and detection electrodes may form plate capacitors. This simplifies manufacturing of the acceleration sensor.

The acceleration sensor may by a micro-electro-mechanical structure (MEMS). This allows obtaining the above-mentioned advantages for a micro-electro-mechanical acceleration sensor.

Figure 1:
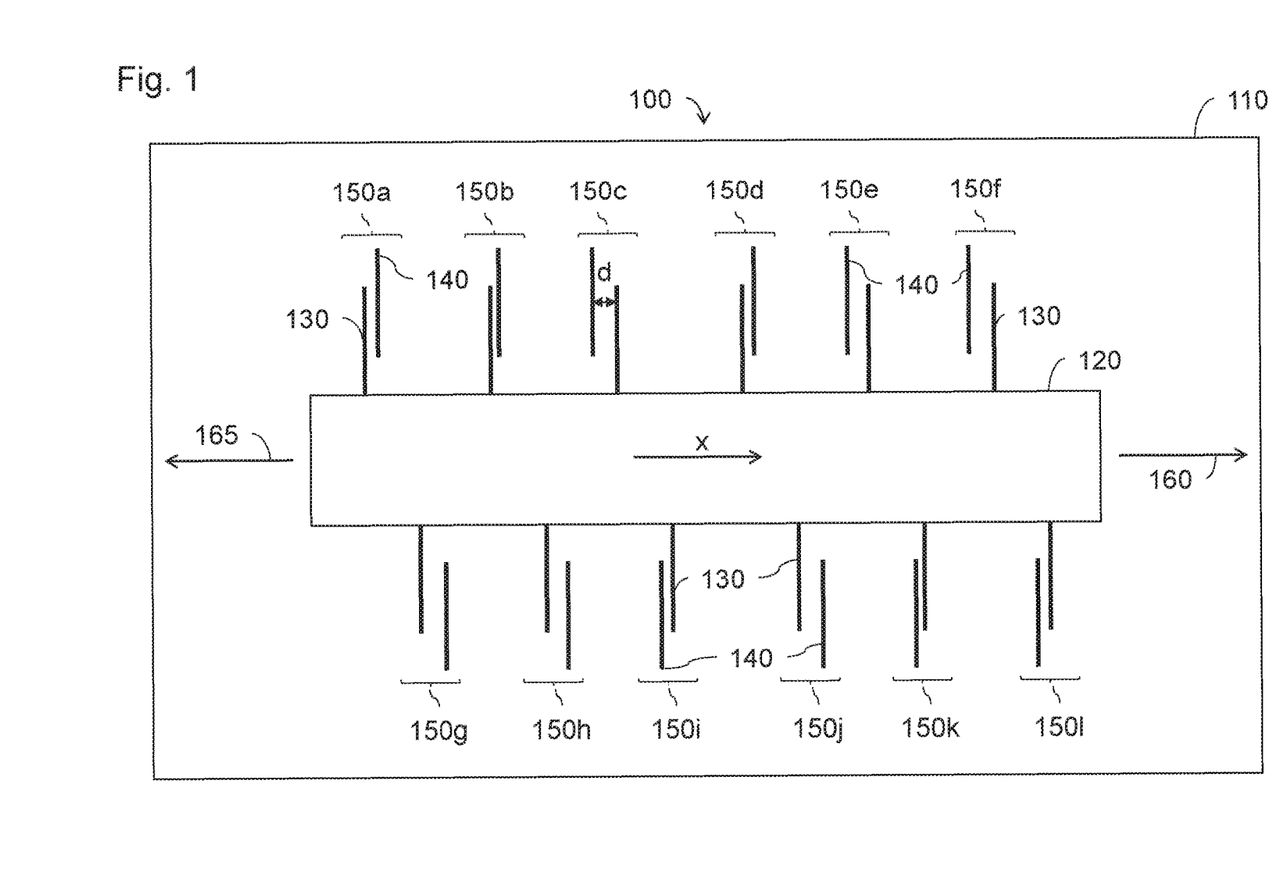
FIG. 1 a schematic block diagram of an acceleration sensor according to an embodiment.

This and further advantages and features of the invention are explained in what follows with respect to examples and the accompanying figures in more detail. It shows:

FIG. 1 shows an acceleration sensor 100 according to an embodiment.

The acceleration sensor 100 comprises a substrate 110 above which an excitation mass 120 having excitation electrodes 130 is mounted such that it can be moved along a movement axis x. The excitation mass 120 may for example be moveably mounted by means of non-illustrated spring elements that are connected via anchor structures with the substrate 110. The movement axis x extends then in a direction along which the spring elements are deformable. The spring elements may for example be deformable only in one direction, while they are stiff in other directions.

On the substrate 110 detection electrodes 140 are arranged that are fixedly connected to the substrate 110. Each of the detection electrodes 140 corresponds to one excitation electrode 130 and constitutes therewith a pairing 150. The detection electrode 140 being closest to a single excitation electrode 130 corresponds to the respective excitation electrode 130.

According to the position of the detection electrode 140 with regard to the excitation electrode 130 corresponding thereto and according to the difference in electric potential between the electrodes each electrode pairing 150 generates a force onto the excitation mass 120. In FIG. 1 pairings 150a, 150b, 150d, 150g, 150h, 150j, for which the detection electrode 140 is arranged on the right-hand side of the excitation electrode 130, generates a force onto the excitation mass 120 that deflects the excitation mass 120 along a first direction 160 (to the right side in FIG. 1). The pairings 150a, 150b, 150d, 150g, 150h, 150j form a first group of pairings.

The pairings 150c, 150e, 150f, 150i, 150k, 150l in which the detection electrode 140 is arranged on the left-hand side of the excitation electrode 130, generate a force that deflects the excitation mass 120 along a second direction 165 opposite to the first direction 160 (to the left side in FIG. 1). The pairings 150c, 150e, 150f, 150i, 150k, 150l form a second group of pairings. The first direction 160 and the second direction 165 lie both on the movement axis x along which the excitation mass 120 can be moved.

To ensure that the resulting force along the first direction 160 corresponds in first approximation to the resulting force along the second direction 165 the number of pairings 150a, 150b, 150d, 150g, 150h, 150j in the first group is equal to the number of pairings 150c, 150e, 150f, 150i, 150k, 150l in the second group.

A distance d between the excitation electrodes 130 and the detection electrodes 140 of the pairings 150 may be different for each pairing 150. Due to this, each pairing 150 generates a force onto the excitation mass 120 that depends on the distance d between detection electrode 140 and the excitation electrode 130 and that is different. As is illustrated schematically in FIG. 1, however, the averaged distance of the pairings 150a, 150b, 150d, 150g, 150h, 150j of excitation electrodes 130 and detection electrodes 140 of the first group is equal to the averaged distance of the pairings 150c, 150e, 150f, 150i, 150k, 150l of excitation electrodes 130 and detection electrodes 140 of the second group. Due to this, the force that is generated by the first group onto the excitation mass 120 becomes equal to the force that is generated by the second group onto the excitation mass 120. Because of this a biasing of measurement results due to different distances d of the pairings 150 is avoided and no bias occurs.

The distances d between the excitation electrodes 130 and the detection electrodes 140 are illustrated in the schematic FIG. 1 for better understanding very different. In addition, the distances d in FIG. 1 vary essentially random. According to a further embodiment the distances d between the electrodes are as similar as possible and vary only very little. Moreover, typically a gradient from smaller to larger distances along a specific direction is present. For example, the distances between the electrodes in the lower left corner of FIG. 1 may be small and become larger towards the upper right corner. The distances may, however, become larger in any other direction within the image plane of FIG. 1.

Alternatively, the averaged distance of the first group corresponds to the averaged distance of the second group, i.e. the averaged distances are not exactly equal, but because of manufacturing tolerances substantially equal. Then, a bias is not completely avoided, but the acceleration sensor 100 has at least a strongly reduced bias.

In FIG. 1 the excitation electrodes 130 and the detection electrodes 140 are illustrated as plate capacitors. According to further embodiments, the electrodes may also have the form of comb electrodes having interleaved electrode fingers or may be formed according to any other shape (cf. lower part of FIG. 4).

Figure 2:
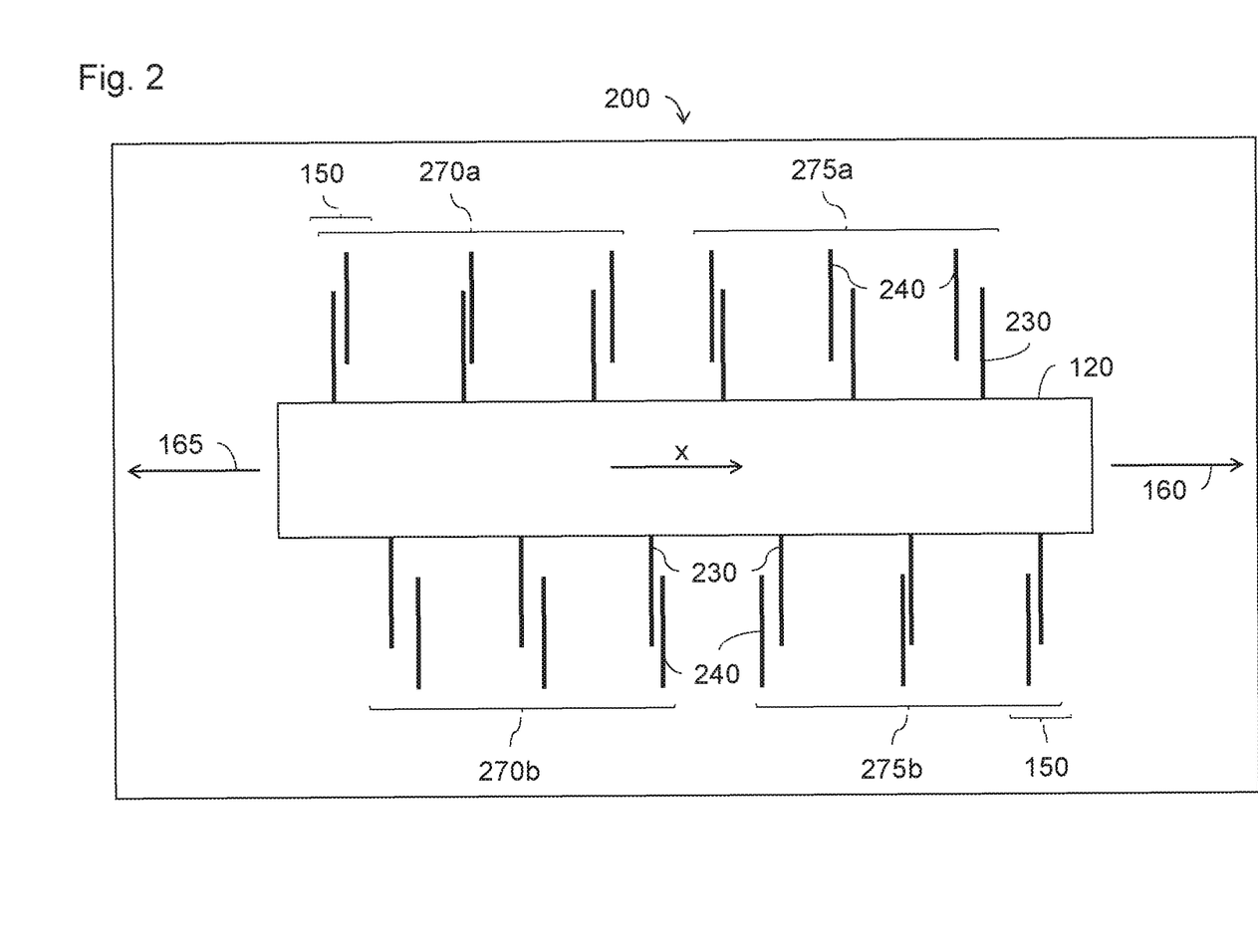
FIG. 2 a schematic block diagram of an acceleration sensor according to a further embodiment.

FIG. 2 illustrates an acceleration sensor 200 according to a further embodiment.

The acceleration sensor 200 differs from the acceleration sensor 100 of FIG. 1 in that pairings 150 of excitation electrodes 230 and detection electrodes 240 that belong to the first group and to the second group are arranged such that at least two subgroups 270a, 270b of the first group and at least two subgroups 275a, 275b of the second group are formed. This means that pairings 150 of the subgroups 270a, 270b of the first group deflect the excitation mass 120 along the first direction 160 and pairings 150 of the subgroup 275a, 275b of the second group deflect the excitation mass 120 along the second direction 165.

Within the single subgroups 270a, 270b, 275a, 275b the pairings 150 of excitation electrodes 230 and detection electrodes 240 are arranged next to each other without being separated by pairings 150 of the respective other group. As illustrated in FIG. 2 for example three pairings 150 of the first group may be arranged next to each other and may form the subgroup 270 of the first group. Adjacent thereto three pairings 150 of the second group are arranged that form the subgroup 175a of the second group. Similarly, on the opposite side of the excitation mass 120 subgroups 270b, 275*b* of the first and the second groups are arranged that are not divided by pairings 150 of excitation electrodes 230 and detection electrodes 240 of the respective other group.

Because of this, pairings 150 that deflect the excitation mass 120 into the same direction are arranged next to each other, due to which arrangement the manufacturing of the acceleration sensor 200 that has averaged gap distances of the first group that correspond to averaged gap distances of the second group can be simplified.

Figure 3:
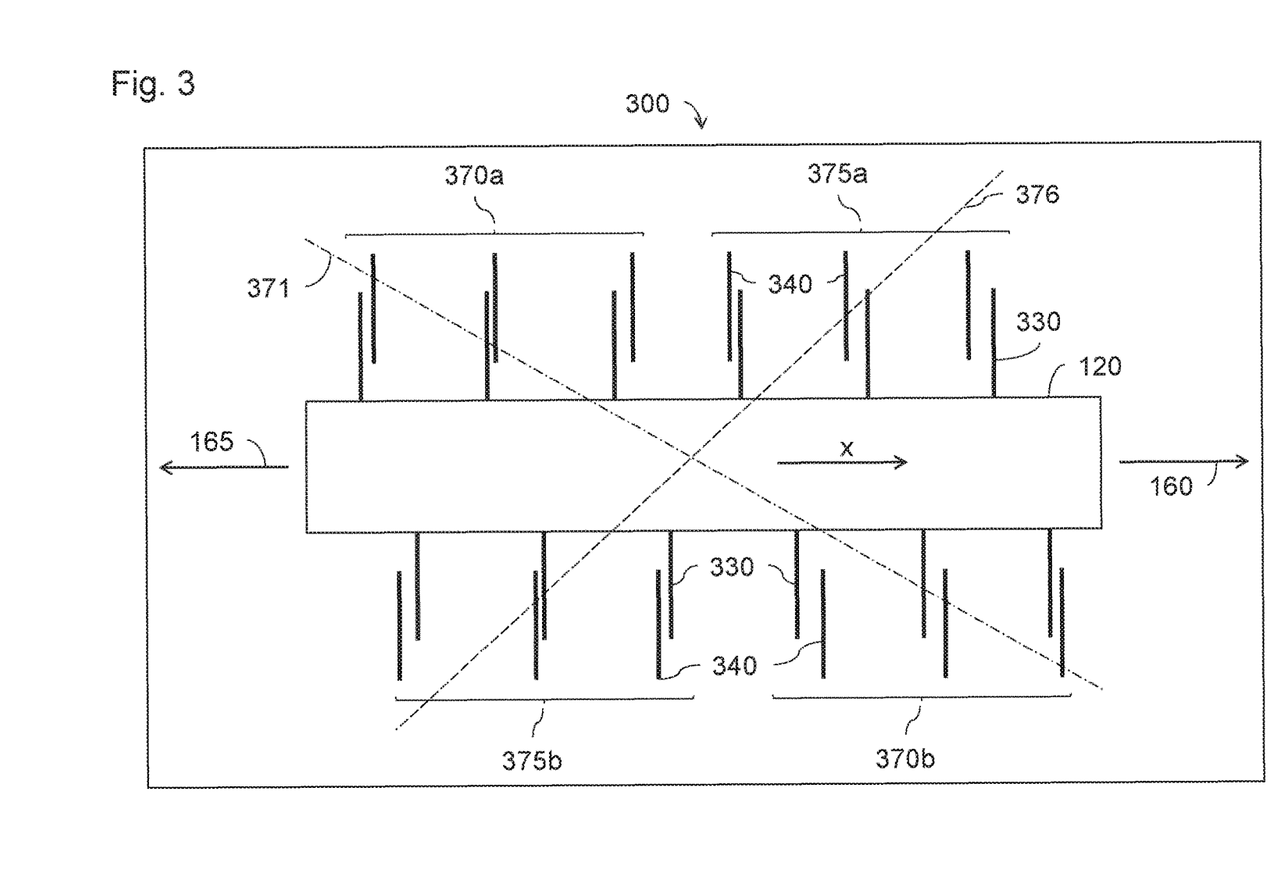
FIG. 3 a schematic block diagram of an acceleration sensor according to a further embodiment.

FIG. 3 illustrates an acceleration sensor 300 according to a further embodiment.

Similarly to the acceleration sensors 100, 200 of FIGS. 1 and 2 the acceleration sensor 300 comprises the substrate 110 as well as the excitation mass 120 that is moveable along an movement axis x.

The acceleration sensor 300 differs from the acceleration sensor 200 of FIG. 2 in that subgroups 370*a*, 370*b* of the first group are arranged cross-over to subgroups 375*a*, 375*b* of the second group. As illustrated in FIG. 3 a virtual first connection line 371 that connects the centers of subgroups 370*a*, 370*b* of the first group crosses a virtual second connection line 367 that connects centers of subgroups 375*a*, 375*b* of the second group. Here, the centers may be defined as centers of the smallest rectangle by which all electrodes 330, 340 of the respective subgroup 370 are enclosed. However, the centers may also be arbitrary points within the spacing between a pairing in the middle of the respective subgroup 370. The centers may also be arbitrary points between two pairings within a subgroup 370 that are arranged at the end of the excitation mass 120.

This arrangement guarantees that during manufacturing of the acceleration sensor 300 the averaged distance between the excitation electrodes 330 and the detection electrodes 340 of the first group corresponds automatically to the averaged distance of excitation electrodes 330 and detection electrodes 340 of the second group. For example, if during etching the excitation mass 120, the excitation electrodes 330, and the detection electrodes 340 out of the substrate 110 etch fluid spreads across the substrate 110 such that the height of the etch fluid in the upper right corner of the substrate 110 is the highest and the height in the lower left corner of the substrate 110 is the lowest, due to the different times in which the etch fluid acts, the distances between the excitation electrodes 330 and the detection electrodes 340 of subgroup 375*a* that is closest to the upper right corner will be the largest, while the distances between the excitation electrodes 330 and the detection electrodes 340 of the subgroup 375*b* that are located closest to the lower left corner of the substrate 110 will be the smallest. Distances of excitation electrodes 330 and detection electrodes 340 of subgroups 370*a* and 370*b* will however be approximately equal and corresponding to the averaged gap distance of the subgroups 375*a*, 375*b*. Since the subgroups 370*a* and 370*b* form the first group and the subgroup 375*a* and 375*b* form the second group it is guaranteed that the averaged distance of electrodes 330, 340 of the first group is approximately or exactly equal to the averaged distance of electrodes 330, 340 of the second group.

In the same manner it is guaranteed by the arrangement of subgroups 370*a*, 370*b* of the first group and the subgroups 375*a*, 375*b* of the second group that the averaged distances of electrodes of the first group and electrodes of the second group are similar for each other gradient of etch fluid height and hence of etch depth. Thus, an acceleration sensor having reduced bias can be formed despite trending and without particular manufacturing techniques.

Figure 4:
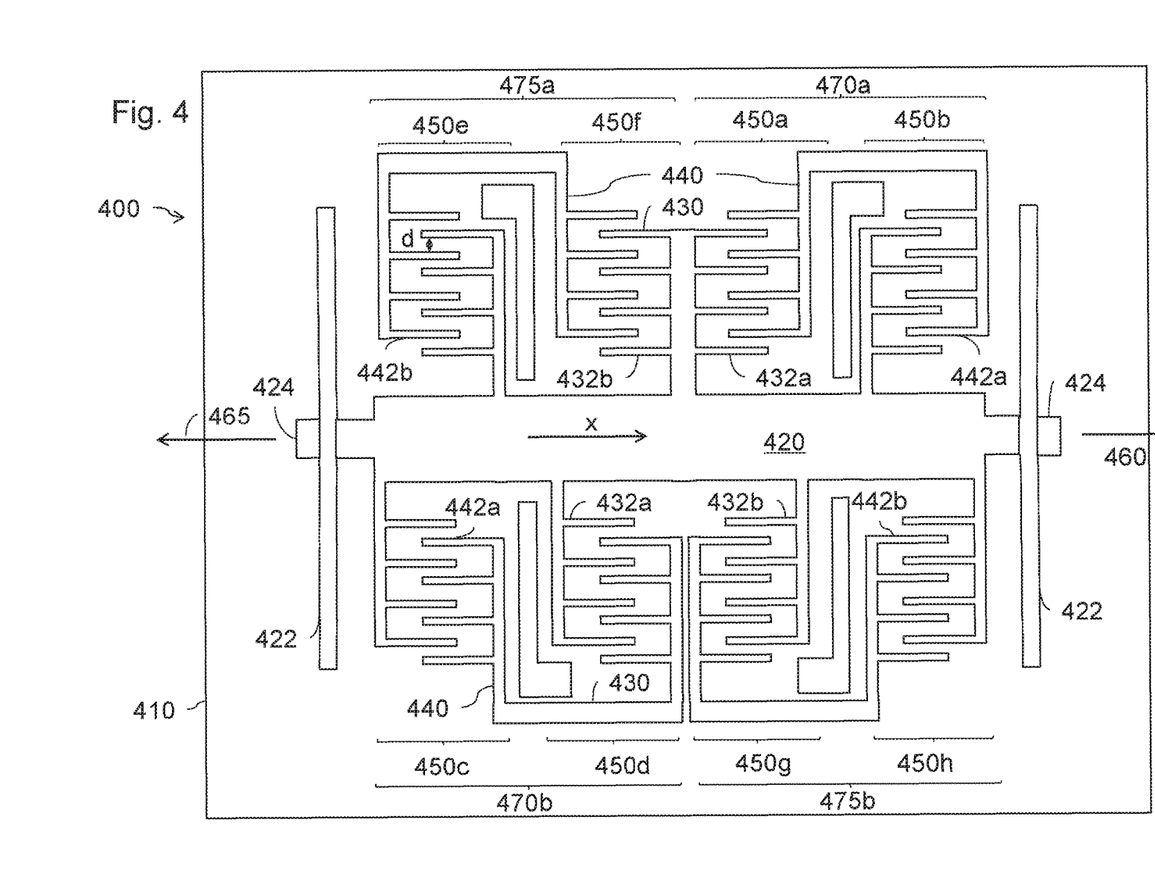
FIG. 4 a schematic block diagram of an acceleration sensor according to a further embodiment.

FIG. 4 illustrated an acceleration sensor 400 according to a further embodiment.

The acceleration sensor 400 comprises a substrate 410, on which anchor structures 424 are formed that support via spring elements 422 an excitation mass 420 such above the substrate 410 that the excitation mass 420 is moveable along a movement axis x that corresponds to the longitudinal direction of the excitation mass 420 illustrated in FIG. 4. This may for example be guaranteed by forming the spring elements 422 as springs, e.g. bending beam springs, that are deformable along the movement axis x, i.e. along the first direction 460 and the second direction 465, but are stiff along other directions, i.e. perpendicular to the projection plane and towards the top and the bottom of FIG. 4.

Excitation electrodes 430 are connected to the excitation mass 420, which excitation electrodes 430 are formed as comb electrodes having electrode fingers 432. With the electrode fingers 432 of the excitation electrodes 430 electrode fingers 442 of the detection electrodes 440 formed as comb electrodes are interleaved, which detection electrodes 440 are fixedly connected to the substrate 410. By forming the electrodes as comb electrodes instead of electrode plates a more precise control of the acceleration sensor 400 and hence a larger measurement precision can be achieved, as the force that is generated by the interleaved comb electrodes is independent of the deflection of the excitation mass 420. Moreover, due to the comb electrode structure undesired effects onto the oscillation system consisting of excitation mass 420 and spring elements 422 such as a modification of the spring constant of the spring elements 422 are avoided.

As illustrated in FIG. 4 damping electrode 445 may be provided between the excitation electrodes 430 and the detection electrodes 440. The damping electrodes 445 are used for damping an oscillation of the excitation mass 420 that is excited by the excitation electrodes 430 and the detection electrodes 440. According to a further embodiment no damping electrodes 445 are present.

The excitation electrodes 430 and the detection electrodes 440 are configured to deflect the excitation mass 420 along a first direction 460 and along a second direction 465 being opposite to the first direction 460. To this end, the excitation electrodes 430 and the detection electrodes 440 are brought to different electric potentials such that by means of the electric field generated between the electrodes a force onto the excitation mass 420 can be generated by the excitation electrodes 430.

The excitation electrodes 430 and the detection electrodes 440 correspond to each other and form pairings 450. Here, the excitation electrodes 430 and detection electrodes 440 are corresponding to each other whose electrode fingers 432, 442 are interleaved with each other. As illustrated in FIG. 4 also several excitation electrodes 430 may be combined to a single electrode. According to a further embodiment all excitation electrodes 430 are formed as separate electrodes.

Depending on the direction of the electrode fingers of the comb electrodes the excitation electrodes 430 and the detection electrodes 440 form electrode pairings 450 that deflect the excitation mass 420 into the first direction 460 or into the second direction 465. In this manner the pairings 450*a*, 450*b*, 450*c*, 450*d* form a first group of pairings of the excitation electrodes 430 and detection electrodes 440 and the pairings 450*e*, 450*f*, 450*g*, 450*h* form a second group of pairings of excitation electrodes 430 and detection electrodes 440. The first group is divided into two subgroups 470*a*, 470*b* and the second group is divided into two subgroups 475*a*, 475*b* of the second group. The subgroups

470a, 470b of the first group are arranged cross-over to the subgroups 475a, 475b of the second group.

The electrode fingers 432a of the excitation electrodes 430 of the first group extend along the first direction 460, the electrode fingers 442a of detection electrodes 440 of the first group extend along the second direction 465, the electrode fingers 432b of excitation electrodes 430 of the second groups extend along the second direction 465, and the electrode fingers 442b of detection electrodes 440 of the second group extend along the first direction 460. A distance d between excitation electrodes 430 and detection electrodes 440 is determined by the distance between the electrode fingers 432, 442 of the respective excitation electrodes 430 and detection electrodes 440.

The acceleration sensor 400 is manufactured by etching its single components out of the substrate 410. During etching it is possible that the substrate 410 is inclined by a few degrees or fractions of a degree such that the substrate and the horizontal form an inclination angle. An etch fluid used for etching will then spread over the substrate 410 such that the surface of the etch fluid is substantially horizontal and hence forms an inclination angle with the surface of the substrate 410. Due to this, the height of the etch fluid on the substrate 410 will differ and different etch depths and widths are generated depending on the height of the etch fluid.

If the substrate 410 is for example slightly inclined along a diagonal running from upper left towards lower right, the height of the etch fluid on the substrate 410 will be higher in the upper right corner than in the lower left corner of the substrate 410. Due to this, the etch depth in the lower left corner will be smaller than the etch depth in the upper right corner such that the distance d between the excitation electrodes 430 and the detection electrodes 440 in the lower left corner will be smaller than in the upper right corner. The distance of the excitation electrodes 430 and the detection electrodes 440 will then be approximately equal along the diagonal running from the lower right corner to the upper left corner and will correspond to the averaged distance of excitation electrodes 430 and detection electrodes 440 of subgroups 470a, 470b of the first group. In the same manner, the averaged distances between the excitation electrodes 430 and detection electrodes 440 of the first group will correspond to the averaged distances of the excitation electrodes 430 and detection electrodes 440 of the second group for a different gradient of the etch fluid height over the substrate 410. This ensures that during manufacturing of the acceleration sensor 400 it is not necessary to monitor a spread of etch fluid, while nevertheless an acceleration sensor having a reduced bias can be manufactured.

Figure 5:
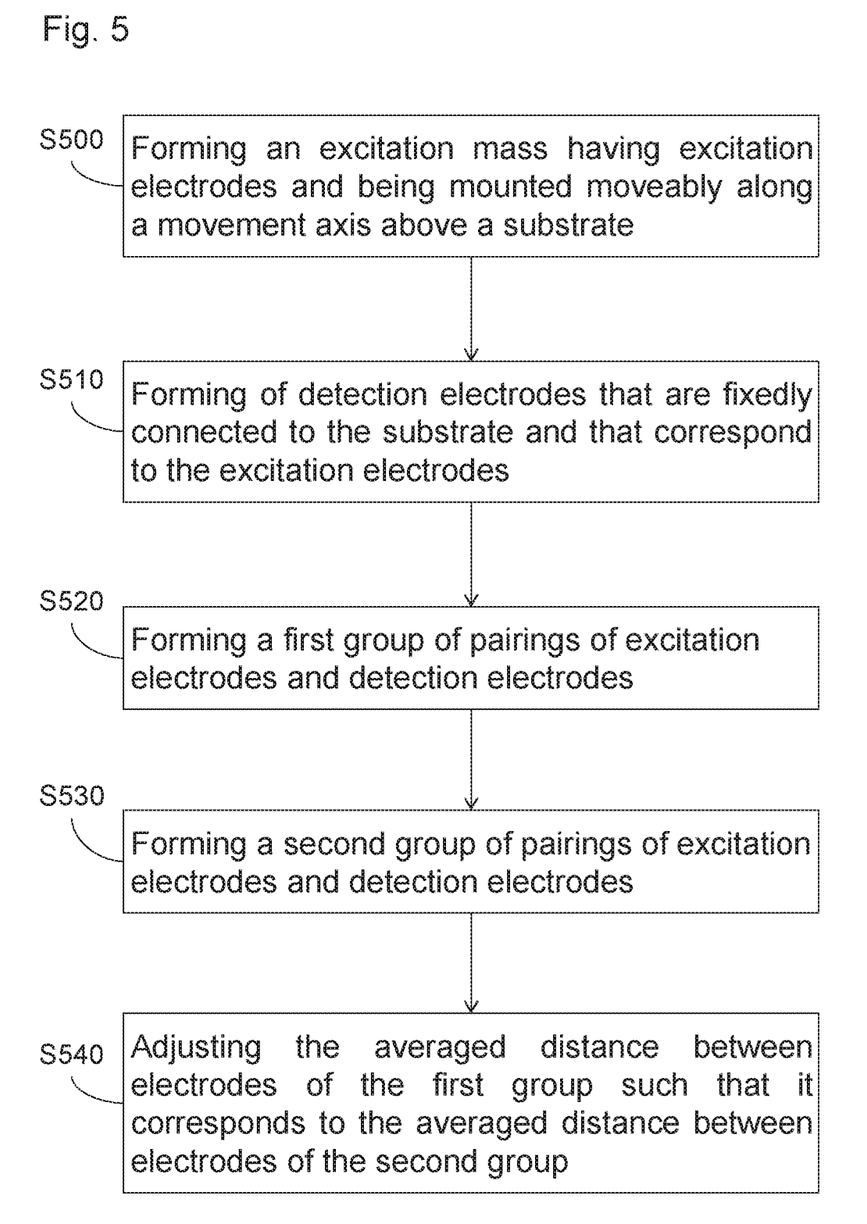
FIG. 5 a schematic process flow of a method for manufacturing an acceleration sensor according to an embodiment.

FIG. 5 illustrates a process flow of a method for manufacturing an acceleration sensor.

At S500 an excitation mass having excitation electrodes is formed above a substrate, which excitation mass is mounted moveably along a movement axis x.

At S510 detection electrodes that are fixedly connected to the substrate and that corresponds to the excitation electrodes are formed.

At S520 a first group of pairings of excitation electrodes and corresponding detection electrodes is formed that is configured to deflect the excitation mass along the movement axis x in a first direction.

At S530 a second group of pairings of excitation electrodes and corresponding detection electrodes is formed that is configured to deflect the excitation mass along the movement axis in a second direction that is opposite to the first direction. The number of pairings in the first groups is here equal to the number of pairings in the second group.

At S540 the averaged distance between excitation electrodes and detection electrodes of pairings of the first group is adjusted such that it corresponds to the averaged distance between excitation electrodes and detection electrodes of the pairings of the second group.

According to further not illustrated methods acceleration sensors according to the above-described embodiments may be manufactured.

This allows manufacturing of acceleration sensors in which forces generated by excitation electrodes and detection electrodes of the first group are equal to forces generated by excitation electrodes and detection electrodes of the second group. The sensors can therefore provide reduced bias.

The invention claimed is:

1. An acceleration sensor comprising:
an excitation mass having excitation electrodes, which excitation mass is mounted moveably along a movement axis above a substrate;
detection electrodes that are fixedly connected to the substrate and that correspond to the excitation electrodes; wherein
a first group of pairings of excitation electrodes and corresponding detection electrodes is configured to deflect the excitation mass along the movement axis in a first direction;
a second group of pairings of excitation electrodes and corresponding detection electrodes is configured to deflect the excitation mass along the movement axis in a second direction that is opposite to the first direction;
the number of pairings in the first group is equal to the number of parings in the second group;
the excitation electrodes and the detection electrodes of the first group of pairings and of the second group of pairings are arranged such that the averaged distance between excitation electrodes and detection electrodes of pairings of the first group corresponds to the averaged distance between excitation electrodes and detection electrodes of pairings of the second group;
the first group comprises at least two subgroups of pairings;
the second group comprises at least two subgroups of pairings
in the subgroups excitation electrodes and detection electrodes are arranged alternatingly;
a virtual first connecting line between centers of the two subgroups of the first group crosses a virtual second connection line between centers of the two subgroups of the second group.

2. The acceleration sensor according to claim 1, wherein
at a first side of the excitation mass that is parallel to the movement axis there are consecutively arranged along the first direction at least two excitation electrodes of the first group and at least two excitation electrodes of the second group;
at a second side of the excitation mass that is parallel to the movement axis there are consecutively arranged along the first direction at least two excitation electrodes of the second group and at least two excitation electrodes of the first group; and wherein
the two excitation electrodes of the first group arranged at the first side of the excitation mass are opposite to the two excitation electrodes of the second group arranged at the second side of the excitation mass.

3. The acceleration sensor according to claim 1, wherein
the excitation electrodes and the detection electrodes comprise comb electrodes having electrode fingers extending along the movement axis;
the electrode fingers of the excitation electrodes of the first group extend along the first direction;
the electrode fingers of the detection electrodes of the first group extend along the second direction;
the electrode fingers of the excitation electrodes of the second group extend along the second direction;
the electrode fingers of the detection electrodes of the second group extend along the first direction; and wherein
the distance between excitation electrodes and detection electrodes is defined by the distance between the electrode fingers of the corresponding excitation electrodes and detection electrodes.

4. The acceleration sensor according to claim 1, wherein the pairings of excitation electrodes and detection electrodes form plate capacitors.

5. The acceleration sensor according to claim 1, wherein the acceleration sensor is a micro-electro-mechanical structure.

6. A method for manufacturing an acceleration sensor comprising the steps:
forming of an excitation mass having excitation electrodes, which excitation mass is mounted moveably along a movement axis above a substrate;
forming of detection electrodes that are fixedly connected with the substrate and that correspond to the excitation electrodes; wherein
the steps comprise:
forming of a first group of pairings of excitation electrodes and corresponding detection electrodes that is configured to deflect the excitation mass along the movement axis in a first direction;
forming of a second group of pairings of excitation electrodes and corresponding detection electrodes that is configured to deflect the excitation mass along the movement axis in a second direction that is opposite to the first direction, wherein
the number of pairings in the first group is equal to the number of parings in the second group; and
the excitation electrodes and the detection electrodes of the first group of pairings and of the second group of pairings are formed such that the averaged distance between excitation electrodes and detection electrodes of pairings of the first group such that it corresponds to the averaged distance between excitation electrodes and detection electrodes of the pairings of the second group;
the first group comprises at least two subgroups of pairings;
the second group comprises at least two subgroups of pairings;
in the subgroups, excitation electrodes and detection electrodes are arranged alternatingly;
a virtual first connecting line between centers of the two subgroups of the first group crosses a virtual second connection line between centers of the two subgroups of the second group.

* * * * *

UNITED STATES PATENT AND TRADEMARK OFFICE
CERTIFICATE OF CORRECTION

PATENT NO. : 9,983,226 B2  
APPLICATION NO. : 15/541389  
DATED : May 29, 2018  
INVENTOR(S) : Peter Leinfelder Page 1 of 1

It is certified that error appears in the above-identified patent and that said Letters Patent is hereby corrected as shown below:

In the Specification

Column 12, Line 17 reads "group such that it corresponds" should read --group corresponds--

Signed and Sealed this  
Tenth Day of July, 2018

Andrei Iancu  
*Director of the United States Patent and Trademark Office*